C. A. KRECHLER.

RECTIFIER.

No. 162. Reissued Feb. 26, 1850.

THE NORRIS PETERS CO., PHOTO-LITHO., WASHINGTON, D. C.

UNITED STATES PATENT OFFICE.

CHARLES A. KRECHLER, OF STOCKHOLM, SWEDEN.

IMPROVEMENT IN DISTILLING APPARATUS.

Specification forming part of Letters Patent No. 6,586, dated July 10, 1849; Reissue No. 162, dated February 26, 1850.

*To all whom it may concern:*

Be it known that I, CHAS. A. KRECHLER, of the city of Stockholm, in the Kingdom of Sweden, have invented certain new and useful Improvements in Apparatus Used for the Distillation and Rectification of Spirituous Liquors, of which the following is a full, clear, and exact description, reference being had to the accompanying drawings, which form part of this specification, and in which—

Figure 1:
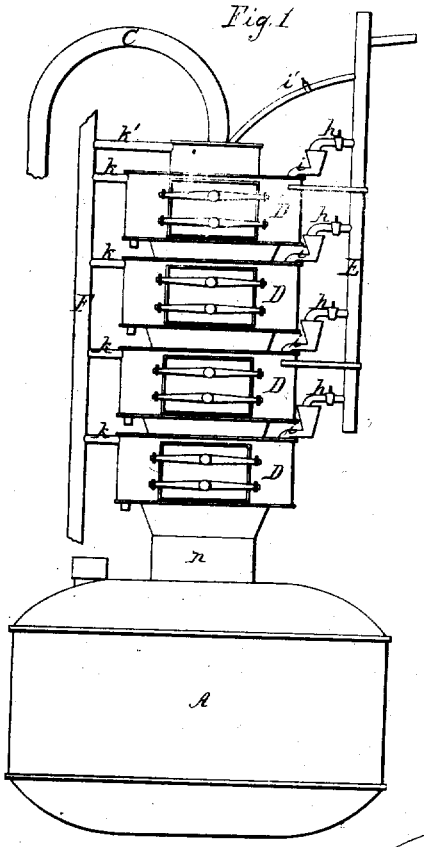
Figure 2:
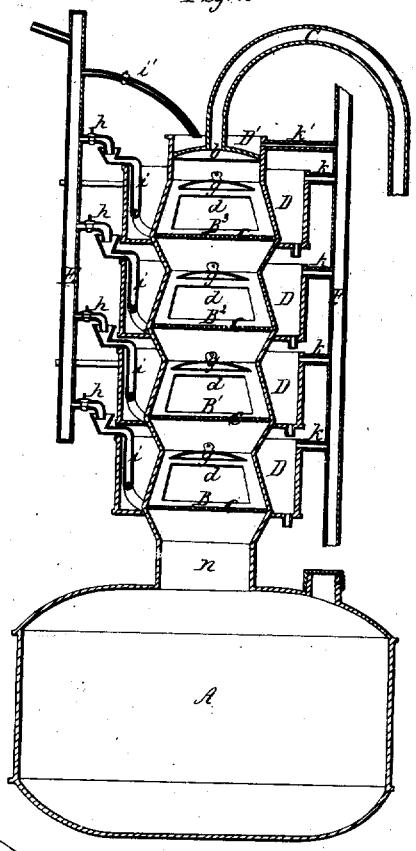
Figure 3:
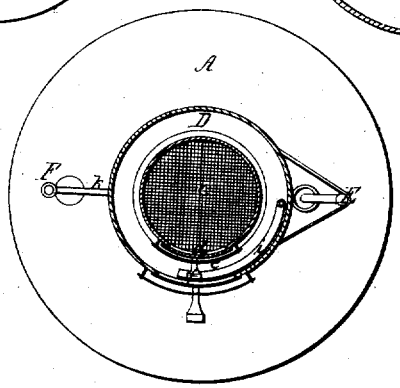

Figure 1 represents an elevation of my improved apparatus. Fig. 2 is a vertical section through the center of the same, and Fig. 3 is a horizontal section through the center of one of the rectifying-chambers.

My invention consists in a rectifier of peculiar construction and arrangement, through which the vapor from the boiler is passed in its way to the condenser. By this improved rectifier the spirituous vapor is freed from the vapors of the essential oils and water which arise with it from the liquid in the boiler, and is then either passed directly to the condenser or is first passed through substances introduced in the rectifier to impart any desired flavor to the distilled spirit. A spirit of great purity and strength is thus obtained by a single distillation, while at the same time the construction of the apparatus is such that the vapors passing upward from the boiling liquid are deflected downward and reverberated against the surfaces of the rectifying substances through which they have passed in ascending, which substances can be easily charged into the rectifier and removed from it when saturated with the essential oils without dismounting the apparatus. The water for condensing the aqueous vapor is also supplied in such manner as to enable it to act with efficiency and economy.

The drawings hereunto annexed represent the rectifier as attached to a boiler, the apparatus for condensing the rectified spirituous vapors being omitted, as its form and arrangement do not influence the nature of the product.

The boiler A is constructed in any of the usual methods, care being taken to set it in such a manner as will insure an economical expenditure of fuel. The vapors produced pass upward through the neck *n* of the boiler into the rectifier. The latter consists of a series of chambers, B B′ B² B³, each surmounted with a case, into which water may be introduced. Each of these rectifying-chambers is formed of the frusta of two hollow cones united at their bases and open at top and bottom. The upper cone is the higher of the two, and its open top communicates directly with the open bottom of the one next succeeding it in ascending from the boiler, the lowermost chamber communicating in this instance directly with the neck of the boiler. The top of the uppermost chamber is closed by a convex plate, *b*, from which a pipe, C, proceeds to the condenser. Each rectifying-chamber is divided into two portions by a grating or perforated plate, *c*, on which the substances used for rectifying the spirituous vapors or for flavoring the rectified vapors are placed, and the upper portion of each is furnished with a suitable charging-hole, *d*, through which these substances can be introduced or removed. These charging-holes are each fitted with a suitable door-plate, properly secured by cross-bars *e* and screws *f*, by which the opening can be tightly closed. The top of each chamber is almost wholly closed by a convex plate, *g*, supported therein. This obstructs the passage of the vapor and reverberates it upon the surface of the rectifying substance and against the conical surface of the chamber.

Each rectifying-chamber is surmounted by a water-case, D, which is furnished with a charging-hole and door-plate corresponding in position with the charging-hole in the inner chamber. A pipe, E, is supported at the side of the rectifier, from which pipe water can be supplied to each water-case by a stop-cock, *h*, by which the supply is regulated. The water from the stop-cock flows into a pipe, *i*, which is prolonged downward to the bottom of the water-case, and is there carried spirally round a portion of the rectifying-chamber, thus communicating a whirling motion to the issuing water and keeping it of equal temperature on all sides of the case, while at the same time the entering water, being forced to traverse a long distance round and round the inner chamber, has its temperature gradually and equally augmented until it is discharged through an overflow-pipe, *k*, placed at the top of the case, into a waste-pipe, F, supported at the side of the rectifier. The convex plate *b*, which closes the top of the uppermost rectifying-chamber, forms the bottom of a water-case, D′, whose sides are formed by prolonging the neck of the rectifying-chamber, and it also is furnished with supply (*i′*) and overflow (*k′*) pipes.

The drawings represent a rectifier composed of four chambers, each furnished with a single concave plate; but I do not confine myself to this precise number, as more or less chambers, each furnished with one or more concave plates, may be used, as circumstances may render expedient.

The rectifier thus described may be used to perform one or all of three distinct operations, either jointly or separately, upon the vapor given off by the liquid in the boiler—namely, the condensation of the aqueous vapor, the separation of the vapor of the essential oil, and the flavoring of the alcoholic vapor. The order in which these operations are performed may be varied as circumstances render expedient. Thus the aqueous vapor may be condensed and the vapor of the essential oil separated at the same time; or the aqueous vapor may be condensed first and the vapor of the essential oil be then separated; or the vapor of the essential oil may be first separated, and the aqueous vapor be then condensed.

When the rectifier is employed to condense the aqueous vapor and separate the vapor of the essential oil at the same time, the distillation is performed in the following manner: The liquid from which the spirit is to be distilled is introduced into the boiler. One or more of the rectifying-chambers, according to the purity of the spirit required, are charged through the holes *d* with any substance (charcoal, for instance) by which the essential oils are absorbed, which charged substance is placed upon the perforated plates, and if a flavor is to be imparted to the distilled spirit the flavoring substance is placed in a chamber above those containing the rectifying substance. The charging-holes are now tightly closed, and water is admitted into one or more of the water-cases, according to the strength of the spirit required. As soon as the liquid in the boiler reaches the boiling-point the mixed vapors of spirit, water, and the essential oil of the crude spirit ascend through the neck of the boiler into the rectifying-chambers. If at the commencement of the operation the water in the cases be cold, the vapors will be wholly condensed; but as fresh vapors ascend the temperature of the water is quickly raised until it arrives at about that of boiling spirit, which point it is prevented from exceeding by the introduction of cold water from the supply-pipe E. As now the vapors pass upward through the chambers they come in contact with their cooled conical sides, by which the aqueous vapor is condensed, while at the same time the essential oil is absorbed by the charcoal on the perforated plates. The conical sides of the chambers, together with the concave plates at their tops, reverberate the ascending currents, thus prolonging their stay in the rectifier and diminishing the number of rectifying-chambers required. The rectified vapor passes last through the substance by which the requisite flavor is imparted, and is then conducted through the pipe C to the condenser.

I have thus described the condensation of the aqueous vapor as taking place in the same chambers which contain the rectifying substance by which the vapor of the essential oil is absorbed, as this method is preferable in conducting the distillation of certain liquids. In distilling other liquids the vapor from the boiler should be first freed from the aqueous vapor and afterward from the essential oil. When this method is adopted, the lower chambers alone are surrounded by water, while the rectifying substances are placed in the upper chambers, which are not surrounded by water. Cases will also occur where it will prove advisable to separate the essential oil first. In such cases the rectifying substance must be placed in the lower chambers, and the aqueous vapor must afterward be condensed in upper chambers surrounded by water. My apparatus is adapted to any one of these three methods of rectification, as each chamber is constructed with a charging-hole through which the rectifying substance can be introduced, and each is also furnished with a water-case having separate supply and discharge pipes; hence any one or all the chambers may be charged with the rectifying substance, and any one or all may be used as condensing-chambers.

The flavoring of the rectified alcoholic vapor is a supplementary process. It is conveniently performed in my apparatus by placing the flavoring substance in an upper chamber.

This rectifier is applicable to the distillation, rectification, and flavoring of all descriptions of liquids containing alcohol generated in the process of fermentation. It is also applicable to the rectification and flavoring of those crude spirituous liquors which have been obtained by the ordinary processes of distillation. For these purposes it is superior to all rectifiers hitherto used, as it not only frees the spirituous vapor from the aqueous vapor by the condensation effected by the cooled conical surfaces of the rectifying-chambers, and from the essential oils by the charcoal or other rectifying substances placed upon the perforated plates, but also affords a ready means of charging and discharging any one chamber of these substances without dismounting the apparatus or disturbing the other chambers, while at the same time any desired flavor can be imparted by introducing the flavoring substance into the upper chambers through which the rectified spirituous vapor is passed.

I do not claim the use of charcoal as an absorbent of the essential oil, nor of the process of passing the vapors from the boiling liquid through successive masses of a rectifying substance; neither do I claim the condensation of the aqueous vapor by passing the ascending vapors through chambers cooled below the boiling-point of water, nor the flavoring of a spirit by passing its vapor through any particular flavoring substance, as I am aware that all these things have been long since done; but What I do claim as my invention, and desire to secure by Letters Patent, is—

1. The particular construction and arrangement of the rectifier as herein set forth—that is to say, first constructing the rectifying-chambers and water-cases with charging-holes, substantially as herein set forth, by which means the various substances employed to rectify or to flavor the spirit can be easily charged into or discharged from any one chamber without dismounting the apparatus or removing the substances in the other chambers.

2. The particular form of the rectifying-chambers, which are made of the frustra of two cones united at their bases, the upper forming the condensing-surface of the aqueous vapor.

In testimony whereof I have hereunto signed my name this 26th day of December, 1849.

CHARLES A. KRECHLER.

Witnesses:

CHAUNCEY BUCKLEY,
MOSES HAGER.